(12) United States Patent
Goncalves et al.

(10) Patent No.: US 9,935,893 B2
(45) Date of Patent: Apr. 3, 2018

(54) SYSTEMS AND METHODS FOR DYNAMICALLY ALLOCATING COMPUTING TASKS TO COMPUTER RESOURCES IN A DISTRIBUTED PROCESSING ENVIRONMENT

(71) Applicant: The Travelers Indemnity Company, Hartford, CT (US)

(72) Inventors: Joao G. Goncalves, Vernon, CT (US); Patrick N. Maher, Gibsonton, FL (US); Stacy Morris-Carter, Glen Allen, VA (US); John S. Nowhitney, Albany, NY (US); Michael J. Dulz, Windsor, CT (US); Edward A. Hennen, St. Paul, MN (US); Sharon L. Costa, East Longmeadow, MA (US); Jon S. Williams, River Falls, WI (US); Matthew Zheng, Jackson Heights, NY (US)

(73) Assignee: The Travelers Indemnity Company, Hartford, CT (US)

( * ) Notice: Subject to any disclaimer, the term of this patent is extended or adjusted under 35 U.S.C. 154(b) by 180 days.

(21) Appl. No.: 15/082,007

(22) Filed: Mar. 28, 2016

(65) Prior Publication Data
US 2017/0279734 A1    Sep. 28, 2017

(51) Int. Cl.
*H04L 12/911* (2013.01)
*H04L 29/08* (2006.01)

(52) U.S. Cl.
CPC ............ *H04L 47/781* (2013.01); *H04L 47/70* (2013.01); *H04L 67/10* (2013.01); *H04L 67/30* (2013.01)

(58) Field of Classification Search
USPC ....... 709/226, 224, 225, 229, 217, 219, 220, 709/221, 222, 223, 246, 201
See application file for complete search history.

(56) References Cited

U.S. PATENT DOCUMENTS

| | | | |
|---|---|---|---|
| 6,516,350 B1 * | 2/2003 | Lumelsky | H04L 29/06 709/224 |
| 8,434,126 B1 * | 4/2013 | Schepis | H04N 21/44222 726/1 |
| 2011/0138396 A1 * | 6/2011 | Chen | G06F 9/5066 718/105 |
| 2012/0215576 A1 * | 8/2012 | Jensen | G06Q 10/06311 705/7.13 |
| 2012/0254966 A1 * | 10/2012 | Parker | G06F 9/5027 726/7 |
| 2014/0109184 A1 * | 4/2014 | Parker, II | H04W 12/06 726/3 |
| 2017/0279734 A1 * | 9/2017 | Goncalves | H04L 47/781 |

* cited by examiner

*Primary Examiner* — Jude Jean Gilles
(74) *Attorney, Agent, or Firm* — Michael D. Downs; Fincham Downs LLC

(57) ABSTRACT

In some embodiments, systems and methods provide for assigning networked computer resources to computing tasks, based on, for example, task complexity and/or computer resource workload.

24 Claims, 6 Drawing Sheets

| Computing Task ID | Sub-task ID | Type | Computer Resource Score | Assigned Resource |
|---|---|---|---|---|
| 005 | 005-01 | A | 1 | CR05 |
| 005 | 005-02 | A | 1 | CR05 |
| 005 | 005-03 | C | 6 | CR03 |
| 020 | 020-01 | B | 3 | CR06 |
| 022 | 022-01 | A | 1 | CR02 |
| 022 | 022-02 | C | 6 | CR07 |
| 027 | 027-03 | B | 3 | CR02 |

FIG. 3

| Computer Resource ID | Computing Sub-task Type(s) | Maximum Computing Workload | Current Computing Workload |
|---|---|---|---|
| CR01 | A | 45 | 31 |
| CR02 | A,B | 23 | 5 |
| CR03 | A,B,C | 7 | 6 |
| CR04 | A | 38 | 38 |
| CR05 | A,C | 10 | 4 |
| CR06 | B | 55 | 3 |
| CR07 | B,C | 12 | 8 |

FIG. 4

SYSTEMS AND METHODS FOR DYNAMICALLY ALLOCATING COMPUTING TASKS TO COMPUTER RESOURCES IN A DISTRIBUTED PROCESSING ENVIRONMENT

TECHNICAL FIELD OF THE INVENTION

The present invention relates generally to allocating computing tasks to computer resources in networks and distributed computing environments.

BACKGROUND

Some types of computing systems are configured to receive and process a plurality of computing tasks (e.g., from different sources). Despite the importance of managing computing tasks in an efficient manner, known methods for allocating computer resources to handle requests to process computing tasks fail to take into account the suitability of different computer resources to handle a given computing task and/or fail to efficiently allocate sub-tasks of a given computing task.

BRIEF DESCRIPTION OF THE DRAWINGS

An understanding of embodiments described in this disclosure and many of the related advantages may be readily obtained by reference to the following detailed description when considered with the accompanying drawings, of which:

FIG. 3 is a table illustrating an exemplary data structure of a computing task database according to an embodiment of the present invention;

FIG. 4 is a table illustrating an exemplary data structure of a computer resource database according to an embodiment of the present invention;

DETAILED DESCRIPTION

This disclosure relates to systems, methods, apparatus, and computer-readable media for allocating computing tasks to computer resources in networks and distributed computing environments. According to some embodiments, computing tasks may be associated with one or more sub-tasks, which may be allocated to one or more computer resources based on, for example, a sub-task complexity and/or a computing workload associated with available computer resources.

In accordance with some embodiments of the present invention, one or more systems, apparatus, methods, articles of manufacture, and/or computer-readable media (e.g., non-transitory computer-readable memory storing instructions for directing a processor) provide for one or more of:

a) determining computer resource profile information for a plurality of networked computer resources;

b) determining a computing task to be processed;

c) determining, for each sub-task of the computing task, a respective sub-task type;

d) accessing stored computer resource rules;

e) determining, for each sub-task of the computing task, a respective computer resource score;

f) accessing stored computer resource allocation rules; and g) determining an assignment of each sub-task to at least one computer resource.

In accordance with some embodiments of the present invention, one or more systems, apparatus, methods, articles of manufacture, and/or computer-readable media provide for one or more of:

a) determining, for each sub-task of a requested computing task, a respective sub-task type;

b) determining, for each sub-task of the computing task, a respective computer resource score; and c) determining an assignment of each sub-task to at least one computer resource.

In accordance with some embodiments of the present invention, one or more systems, apparatus, methods, articles of manufacture, and/or computer-readable media provide for one or more of:

a) determining, for each computer resource of a plurality of computer resources, a respective computing sub-task type, a maximum computing workload, and a current computing workload;

b) determining a computing task to be processed;

c) determining, for each sub-task of the computing task, a respective sub-task type;

d) determining, for each sub-task of the computing task, a respective complexity level;

e) determining, for each sub-task of the computing task, based on the respective complexity level, a respective computer resource score;

f) determining an assignment of each sub-task to at least one computer resource based on the respective computing sub-task types associated with each computer resource, the respective maximum computing workload associated with each computer resource, the current computing workload associated with each computer resource, and the respective computer resource score associated with each sub-task; and/or g) initiating processing of each sub-task by the assigned at least one computer resource.

Figure 1:
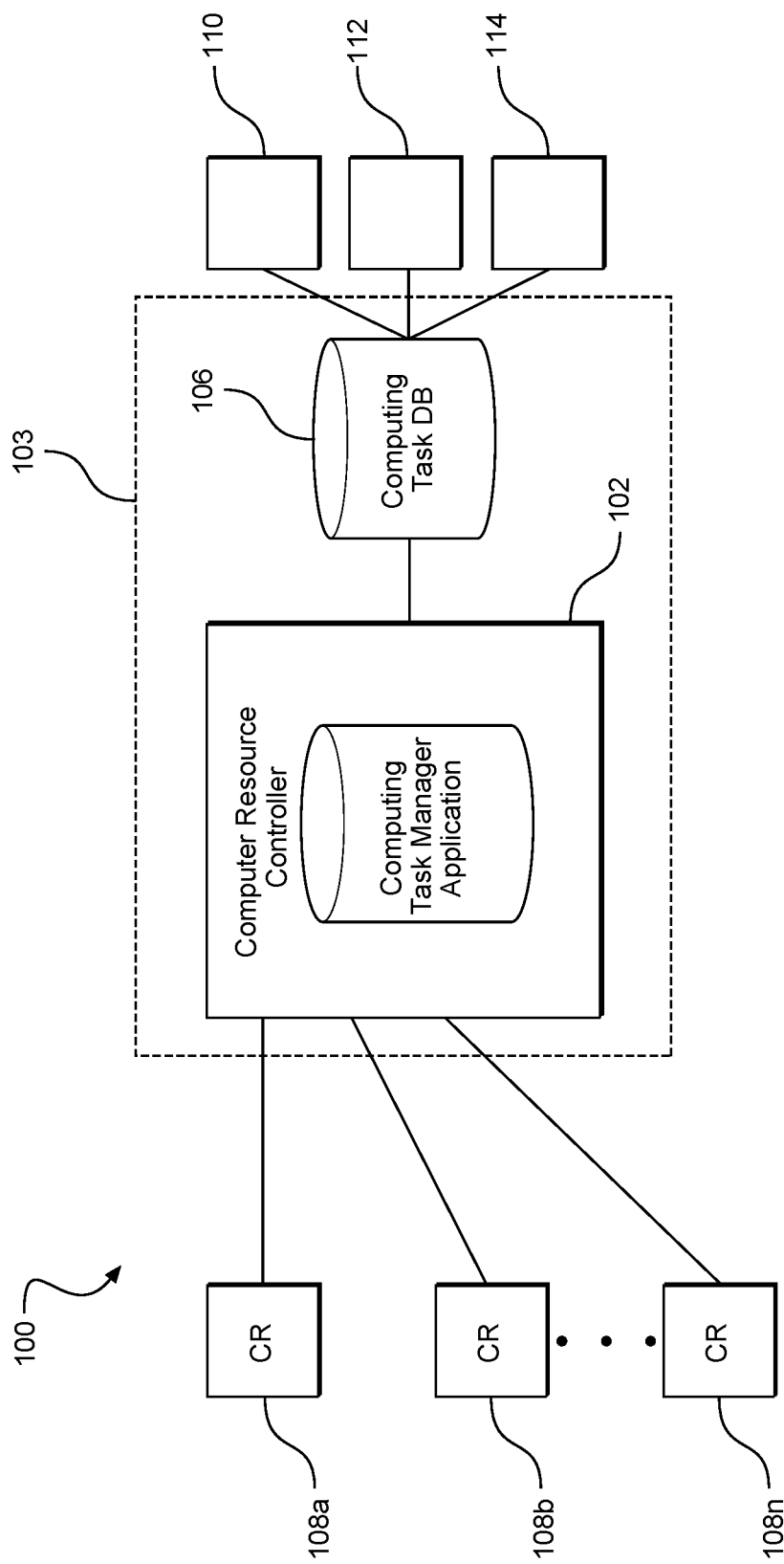
FIG. 1 is a diagram of a system according to an embodiment of the present invention.

FIG. 1 is a block diagram of a system 100 for allocating computing tasks (and/or associated computing sub-tasks) among one or more computer resources, according to some embodiments. The system 100 may comprise a plurality of computer resources 108a-n. In some embodiments, a computer resource controller 102 comprising a computing task manager application may be in communication with one or more of the computer resources 108a-n (e.g., via a communications network). In some embodiments, the computer resource controller 102 (and/or the computer resources 108a-n) may be in communication with a computing task database 106 and/or with one or more computing task requester devices 110, 112, and 114 (e.g., via a communications network). According to some embodiments, the computer resource controller 102 and the computing task database 106 may be embodied in a single server or subsystem 103. In other embodiments, the computer resource controller 102 and the computing task database 106 may be embodied in more than one server.

The computing task database 106 may store, for example, data associated with one or more computing tasks, such as, without limitation, an identifier that uniquely identifies the computing task, information about one or more associated sub-tasks, a complexity of the task and/or an associated sub-task, an associated score (e.g., a computer resource score), and/or an assigned computer resource. Some examples of information associated with a computing task are discussed with respect to FIG. 3.

The computer resources 108a-n and/or the computing task requester devices 110, 112, and 114, in some embodiments, may comprise any type or configuration of electronic, mobile electronic, and/or other computer devices (or combinations thereof). A computer resource or computing task requester device may, for example, comprise one or more of: PC devices, computer servers, computer workstations, laptop computers, tablet computers (e.g., an iPad® manufactured by Apple®, Inc. of Cupertino, Calif.); wireless telephones (e.g., Galaxy S6™ by Samsung Electronics, iPhone® by Apple®, a G4™ smart phone by LG® Electronics, Inc.). In some embodiments, one or more of the computer resources 108a-n and/or computing task requester devices may be specifically utilized and/or configured (e.g., via specially-programmed and/or stored instructions, such as may define or comprise a software application) to communicate with the computer resource controller 102 and/or the computing task database 106 (e.g., via a communications network).

According to some embodiments, the computing task requester devices 110, 112, and 114 are configured to submit computing tasks to the computing task database 106 and/or computer resource controller 102 (e.g., for managing and allocation by the computing task manager application of the computer resource controller 102). In one example, a user may use the computing task requester device 110 to request execution of a computing task by one or more of the computer resources 108a-n. In another example, computing task requester device 112 may be configured to receive and/or generate computing tasks and to forward a request to the computer resource controller 102 for fulfillment of the computing task.

In accordance with some embodiments, computing tasks submitted by the computing task requester devices 110, 112, and 114 are received by the computing task database 106 and processed by computer resource controller 102 (e.g., in accordance with instructions and/or rules of the computing task manager application) to determine to which one or more of computer resources 108a-n the computing task is to be allocated. In one or more embodiments, a computing task may comprise one or more sub-tasks, and each individual sub-task may be allocated to the same computer resource as others for that task, or one sub-task may be allocated to one computer resource (e.g., computer resource 108a) while another sub-task for the same computing task may be allocated (e.g., in accordance with the computing task manager application) to a different computer resource (e.g., computer resource 108b). Some additional examples of computing tasks, and associated processing, are discussed below with respect to FIG. 2, FIG. 3, and FIG. 4.

A communication network may, according to some embodiments, comprise LAN, WAN, cellular telephone network, Bluetooth® network, NFC network, and/or RF network with communication links between the computer resources 108a-n, the computer resource controller 102, the computing task database 106, and/or the computing task requester devices 110, 112, and 114. In some embodiments, a communication network may comprise direct communications links between any or all of the components of the system 100. The computer resource controller 102 may, for example, be directly interfaced or connected to the computing task database 106 via one or more wires, cables, wireless links, and/or other network components, such network components (e.g., communication links) comprising portions of a communication network. In some embodiments, a communication network may comprise one or many other links or network components other than those depicted in FIG. 1. The computer resource 108b may, for example, be connected to the computer resource controller 102 via various cell towers, routers, repeaters, ports, switches, and/or other network components that comprise the Internet and/or a cellular telephone (and/or Public Switched Telephone Network (PSTN)) network, and which comprise portions of a communication network facilitating communication between and among components of the system 100.

It will be readily understood that a communication network for use with one or more embodiments may comprise any number, type, and/or configuration of networks. According to some embodiments, a network may comprise a conglomeration of different sub-networks and/or network components interconnected, directly or indirectly, by the components 108a-n, 102, 106, 110, 112, and 114 of the system 100. For example, a network may comprise one or more cellular telephone networks with communication links between the computer resources 108a-n and the computer resource controller 102, for example, and/or may comprise the Internet, with communication links between the computer resources 108a-n and the computing task database 106, for example.

In some embodiments, the computing task database 106 may comprise any type, configuration, and/or quantity of data storage devices. The computing task database 106 may, for example, comprise an array of optical and/or solid-state hard drives configured to store data and/or various operating instructions, drivers, etc. While the computing task database 106 is depicted as a stand-alone component of the system 100 in FIG. 1, the computing task database 106 may comprise multiple components. In some embodiments, a multi-component computing task database 106 may be distributed across various devices and/or may comprise remotely dispersed components. Any or all of the computer resources 108a-n may comprise the computing task database 106 or a portion of it, for example, and/or the computer resource controller 102 may comprise the computing task database 106 or a portion of it.

Figure 2:
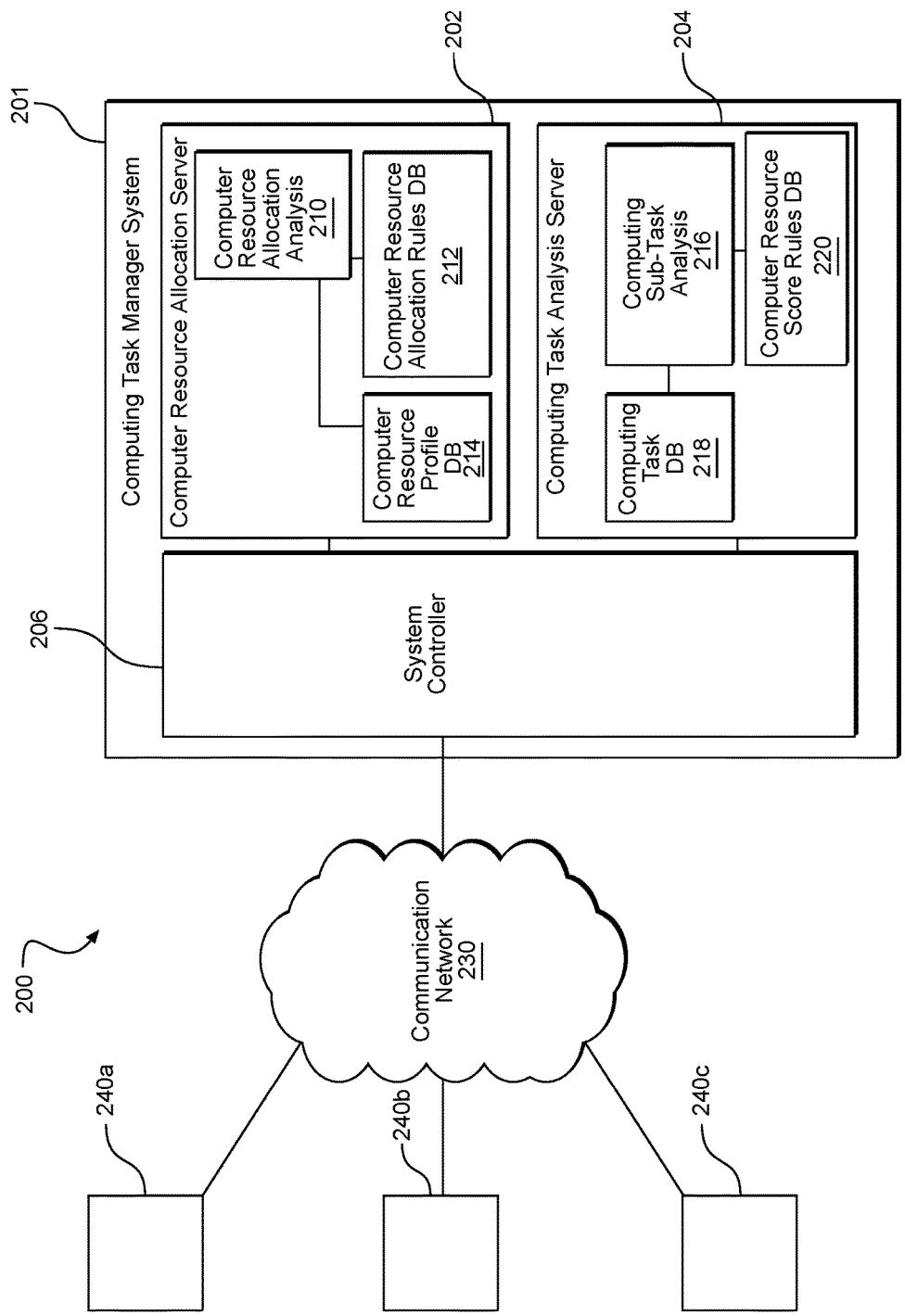
FIG. 2 is a diagram of a system according to an embodiment of the present invention.

FIG. 2 is a diagram illustrating one or more embodiments of the present invention. More specifically, FIG. 2 shows an example system 200 for analyzing and allocating computing tasks. Specifically, the system 200 may provide for determining information about a particular computing task (e.g., related sub-task and complexity information); identifying available computer resources; and/or allocating one or more computer resources to the computing task.

As shown in FIG. 2, the system 200 may comprise a plurality of computer resources 240a-c. Each of the computer resources 240a-c is in communication, using communication network 230, with a computing task manager system 201, which comprises a computer resource allocation server 202, a computing task analysis server 204, and a system controller 206.

As shown in FIG. 2, the computer resource allocation server 202 may comprise computer resource allocation rules database 212 (e.g., containing stored allocation rules for comparing information about computing tasks to be allocated with information about computer resources 240a-c), computer resource allocation analysis instructions 210, and computer resource profile database 214.

Computer resource allocation analysis instructions 210 may store instructions for assigning computing sub-tasks associated with computing tasks to one or more of the computer resources 240a-c. In one example, allocating a sub-task to a computer resource may comprise determining sub-task information (e.g., an associated computer resource score and/or an associated task complexity) for the sub-task, determining computer resource profile information for a computer resource (e.g., a current computing workload, a maximum computing workload, one or more types of sub-tasks the computer resource is configured to process), and/or assigning the sub-task to the computer resource based on the sub-task information and the computer resource profile information, in accordance with one or more rules of computer resource allocation rules database 212.

As shown in FIG. 2, the computing task analysis server 204 may comprise computing sub-task analysis instructions 216, computing task database 218, and computer resource score rules database 220. Computing sub-task analysis instructions 216 may comprise, for example, computer-readable instructions for determining sub-task information associated with sub-tasks (e.g., sub-tasks associated with a computing task forwarded by a requester for processing and stored in computing task database 218) and determining computer resource scores for the sub-tasks by comparing the sub-task information to computer resource score rules (e.g., in database 220).

Illustrated entries of databases provided in this disclosure represent exemplary information only; those skilled in the art will understand that the number and content of the entries can be different from those illustrated. Further, despite the depiction of the databases as tables, an object-based model could be used to store and manipulate the data types of the present invention and, likewise, object methods or behaviors can be used to implement the processes of the present invention.

Referring now to FIG. 3, an example tabular representation 300 illustrates one embodiment of computing task database 106 or computing task database 218 that may be stored, for example, in a system (e.g., system 100, system 200, computing task manager system 201) and/or a server (e.g., computing task analysis server 204, server 103). The tabular representation 300 of the computing task database includes a number of example records or entries, each defining a computing task and corresponding sub-tasks. Those skilled in the art will understand that the computing task database may include any number of entries.

The tabular representation 300 also defines fields for each of the entries or records. The exemplary fields specify: (i) a computing task ID 302 that uniquely identifies a computing task, (ii) a sub-task ID 304 that identifies a sub-task associated with the computing task, (iii) a type identifier 306 that indicates a type for the corresponding sub-task, (iv) a computer resource score 307 associated with the corresponding sub-task, and (v) an assigned resource 308 that indicates (if one has been assigned) a computer resource associated with the corresponding sub-task (e.g., a computer resource about which information is stored in computer resource profile database 214).

As shown in the example tabular representation 300, a given computing task may be associated with any number of one or more related sub-tasks. Each computing task and/or sub-task is preferably associated with a corresponding type 306 that may be used, in some embodiments, for determining which of a plurality of computer resources to which to assign the sub-task. Although the example tabular representation 300 shows a type corresponding to an example alphabetic identifier (e.g., "A," "B," "C"), it will be readily understood that any type of identifiers, and any number of types of identifiers, may be useful for describing the respective types of a plurality of sub-tasks. For example, a set of available sub-task types may include descriptions of different types of tasks, such as, without limitation: "Arithmetic," "Linear regression," and "Volume calculation," (e.g., in the context of computing tasks related to mathematics); or "Simple injury," "Complex injury," and "Surgical procedure" (e.g., in the context of computing tasks related to medical care processes and/or the automated processing of medical records).

In one or more embodiments, each type identifier is associated with a predetermined sub-task computer resource score (e.g., in accordance with a computer resource score rule). For example, a sub-task type of "A" may be associated with a predetermined computer resource score of "1"; other sub-task types may be associated with the same or with different scores, as desired.

In some embodiments, a requester may indicate respective types for sub-tasks associated with a computing task. In other embodiments, a computer resource allocation system may be configured (e.g. based on sub-task information, in accordance with stored rules) to determine sub-task types for sub-tasks it receives for processing.

According to some embodiments, a computing task (and/or a sub-task) may be associated with a corresponding indication of complexity (also referred to in this disclosure as a "complexity level"). In some embodiments, each type of task or sub-task may be associated (e.g., in a stored data table) with a respective complexity level. In one or more embodiments, the complexity level for a type of task or sub-task may be determined based on information associated with a task and/or may be designated, for example, by a requester making a request to process a computing task. In one embodiment, the complexity level may depend on the number and/or types of sub-tasks associated with a computing task. For example, if there are more than a predetermined number of sub-tasks associated with a given task, that may indicate that the task is relatively complex. In another example, a certain type of sub-task may be associated with a relatively low or high complexity, and the association of that type sub-task with the computing task may determine the complexity level for the computing task is relatively complex (e.g., regardless of the total number of sub-tasks, or the other types of sub-tasks).

In one example, a complexity level may be indicated by use of a complexity scale with gradations such as "High," "Medium," and "Low," or "Simple" and "Complex." According to some embodiments, the complexity level may be used to assign one or more computer resources. For example, some types of computer resources may be configured to handle relatively complex sub-tasks. In another example, some types of computer resources may be configured to process sub-tasks having some but not all complexity levels.

Although the example tabular representation 300 shows examples of a computer resource score 307 corresponding to specific numeric values, points, or weights (e.g., "1" for type "A," and "6" for type "C") it will be readily understood that any type of measure (e.g., an alphabetic scale of "A," "B," "C," and so on), and any number of gradations within that scale, may be useful for describing the respective scores of a plurality of sub-tasks. In another example, a computer resource score may include indicators such as "High," "Medium," and "Low."

In one embodiment, the computer resource score 307 may be used, in addition to or as an alternative to type 306, as an indicator of the complexity of a given sub-task (e.g., where the value of the computer resource score 307 reflects a relative complexity of the sub-task).

Referring now to FIG. 4, an example tabular representation 400 illustrates one embodiment of computer resource profile database 214 that may be stored, for example, in a system (e.g., system 100, system 200, computing task manager system 201) and/or a server (e.g., computer resource allocation server 204, server 103). The tabular representation 400 of the computer resource database includes a number of example records or entries, each defining a computer resource. Those skilled in the art will understand that the computer resource profile database may include any number of entries.

The tabular representation 400 also defines fields for each of the entries or records. The exemplary fields specify: (i) a computer resource ID 402 that uniquely identifies a computer resource, (ii) a computing sub-task type(s) 404 that identifies one or more sub-task types the computer resource may be configured to process, (iii) a maximum computing workload 406 that indicates a maximum workload for a predetermined time period (e.g., a number of tasks or sub-tasks per day or other given time period, a total computer resource score for a given time period), and (iv) a current computing workload 408 that indicates a current computing workload allocated and/or in process by the corresponding computer resource (e.g., for a given time period).

In some embodiments, the time period associated with a maximum computing workload and/or current computing workload may be a minute, hour, day, week, month, year, or any period of time deemed suitable for a given implementation.

As shown in the example tabular representation 400, a computer resource may be associated with one or more different sub-task types 404 that the computer resource is configured to process and/or registered as being able to process. In one example, the example computer resource "CR03" is associated with multiple sub-task types "A,B,C," while the example computer resource "CR06" is associated with only one sub-task type "B." For instance, computer resource "CR03" may be qualified (e.g., in accordance with a computer resource allocation rule) to process the example sub-task "005-03" in tabular representation 300, which has a sub-task type of "C," but computer resource "CR06" may not be assigned that sub-task because "CR06" is not associated with sub-task type "C."

According to some embodiments, two sub-tasks of a given task may be assigned to the same computer resource based on their respective types, while a third sub-task of that task may be assigned efficiently to a different computer resource. For example, in the tabular representation 300 both sub-task "005-01" and sub-task "005-02" have the same type ("A") and are both assigned to computer resource "CR05," while sub-task "005-03," with a type of "C," is assigned to computer resource "CR03."

In some embodiments, fewer or more data fields than are shown may be associated with the example data tables 300 and 400. Other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described in this disclosure.

Figure 5:
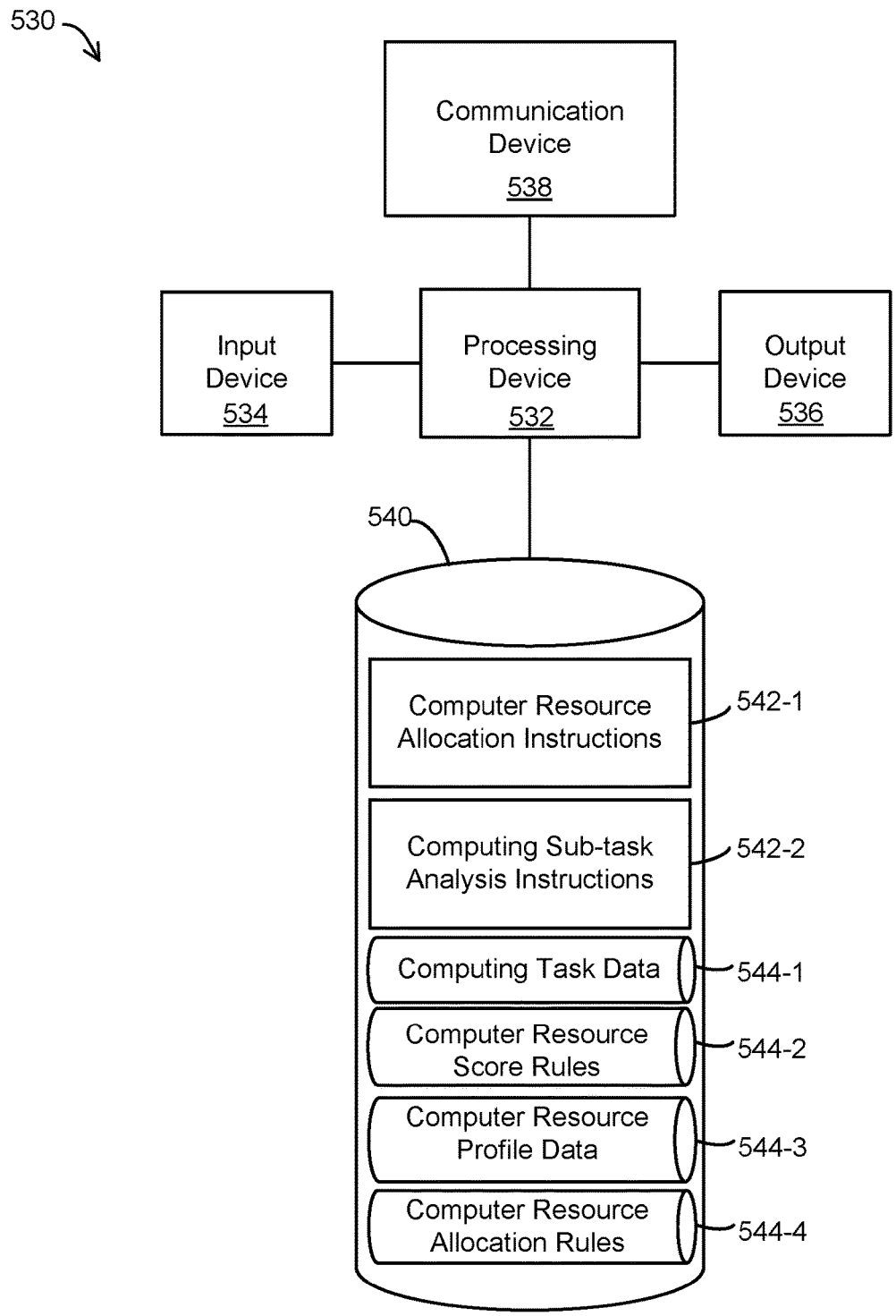
FIG. 5 is a diagram of a computing device according to an embodiment of the present invention.

FIG. 5 shows a block diagram of a computing device 530 according to some embodiments. In one or more embodiments, the computing device 530 may be similar in configuration and/or functionality to any of the computer resource controller 102 of FIG. 1 and/or may comprise a portion of the system 200, the computer resource allocation server 202, and/or the computing task analysis server 204 of FIG. 2. The computing device 530 may, for example, execute, process, facilitate, and/or otherwise be associated with methods described in this disclosure. In some embodiments, the computing device 530 may comprise a processing device 532, an input device 534, an output device 536, a communication device 538, and/or a memory device 540. Fewer or more components 532, 534, 536, 538, 540 and/or various configurations of the components 532, 534, 536, 538, 540 may be included in the computing device 530 without deviating from the scope of embodiments described in this disclosure.

According to some embodiments, the processing device 532 may be or include any type, quantity, and/or configuration of electronic and/or computerized processor. The processing device 532 may comprise, for example, an Intel® IXP 2800 network processor or an Intel® XEON™ Processor coupled with an Intel® E7501 chipset. In some embodiments, the processing device 532 may comprise multiple inter-connected processors, microprocessors, and/or microengines. According to some embodiments, the processing device 532 (and/or portions of the computing device 530) may be supplied power via a power supply (not shown), such as a battery, an Alternating Current (AC) source, a Direct Current (DC) source, an AC/DC adapter, solar cells, and/or an inertial generator. In the case that the computing device 530 comprises a server, such as a blade server, necessary power may be supplied via a standard AC outlet, power strip, surge protector, and/or Uninterruptible Power Supply (UPS) device.

In some embodiments, the input device 534 and/or the output device 536 are communicatively coupled to the processing device 532 (e.g., via wired and/or wireless connections and/or pathways) and they may generally comprise any types or configurations of input and output components and/or devices, respectively. The input device 534 may comprise, for example, a keyboard that allows an operator of the computing device 530 to interface with the computing device 530. In some embodiments, the input device 534 may comprise a sensor configured to provide information to the computing device 530 and/or the processing device 532. The output device 536 may, according to some embodiments, comprise a display screen and/or other practicable output component and/or device. According to some embodiments, the input device 534 and/or the output device 536 may comprise and/or be embodied in a single device, such as a touch-screen monitor.

In some embodiments, the communication device 538 may comprise any type or configuration of communication device. The communication device 538 may, for example, comprise a network interface card (NIC), a telephonic device, a cellular network device, a router, a hub, a modem, and/or a communications port or cable. In some embodiments, the communication device 538 may be coupled to provide data to a computer resource allocation system, a computer resource, and/or a computing task requester device (not shown in FIG. 5), such as in the case that the computing device 530 is utilized to process and/or assign computing tasks and sub-tasks to computer resources as described in this disclosure. The communication device 538 may, for example, comprise a cellular telephone network transmission device that sends signals to a computer resource or other computing device. According to some embodiments, the communication device 538 may also or alternatively be coupled to the processing device 532. In some embodiments, the communication device 538 may comprise an IR, RF, Bluetooth™ and/or Wi-Fi® network device coupled to facilitate communications between the processing device 532 and another device.

The memory device 540 may comprise any appropriate information storage device, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM).

The memory device 540 may, according to some embodiments, store one or more of computer resource allocation instructions 542-1, computing sub-task analysis instructions 542-2, computing task data 544-1, computer resource score rules 544-2, computer resource profile data 544-3, and/or computer resource allocation rules 544-4.

In some embodiments, the computer resource allocation instructions 542-1 may be utilized by the processing device 532 to assign sub-tasks of a received computing task to one or more computer resources, and to output an indication of the assignment and/or the sub-tasks to the assigned computer resources via the output device 536 and/or the communication device 538.

According to some embodiments, the computer resource allocation instructions 542-1 may be operable to cause the processing device 532 to process computing task data 544-1, computer resource score rules 544-2, computer resource profile data 544-3, and/or computer resource allocation rules 544-4 in order to identify, for each sub-task of a received computing task for processing, at least one computer resource to which to assign each sub-task.

In some embodiments, the computing sub-task analysis instructions 542-2 may be used by the processing device 532 (e.g., in accordance with the computer resource allocation instructions 542-1) to analyze sub-tasks to indicate a type, complexity, computer resource score, and/or priority of the sub-tasks.

Any or all of the exemplary instructions and data types described herein and other practicable types of data may be stored in any number, type, and/or configuration of memory devices. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the computing device 530. According to some embodiments, the memory device 540 may be incorporated into and/or otherwise coupled to the computing device 530 (e.g., as shown) or may simply be accessible to the computing device 530 (e.g., externally located and/or situated).

According to some embodiments, processes described in this disclosure may be performed and/or implemented by and/or otherwise associated with one or more specialized processing devices, specialized computers, computer terminals, computer servers, computer systems, and/or networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted.

Figure 6:
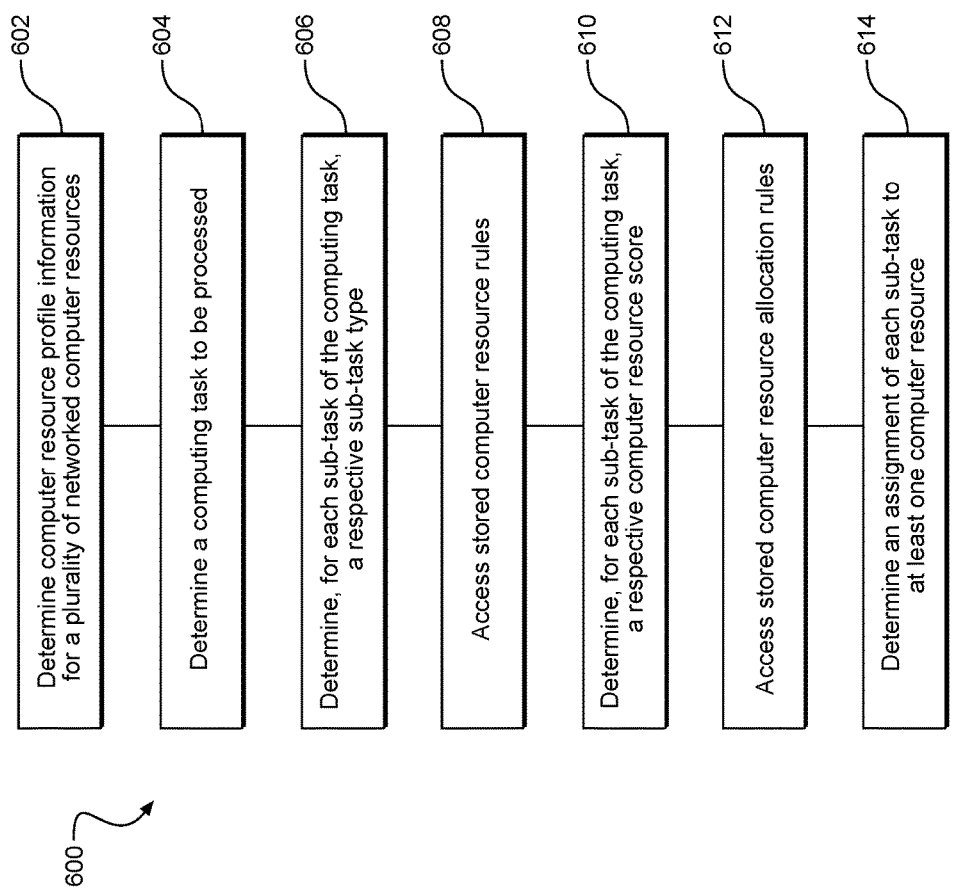
FIG. 6 is a flowchart of a method according to an embodiment of the present invention.

Referring now to FIG. 6, a flow diagram of a method 600 according to some embodiments is shown. The method 600 may be performed, for example, by a specialized server computer (e.g., computer resource controller 102, computer resource allocation server 202), as described with respect to various embodiments in this disclosure.

According to some embodiments, the method 600 may comprise determining computer resource profile information for a plurality of networked computer resources, at 602. In one example, for each computer resource in a computer resource allocation system, the computer resource allocation server may access computer resource profile database in order to determine computer resource profile information (e.g., one or more types of information provided in example tabular representation 400 of FIG. 4).

According to one embodiment, determining computer resource profile information may comprise receiving, by a computing task manager application, respective computer resource profile information for each of a plurality of networked computer resources configured for processing pending computing tasks. In some embodiments, the computer resource profile information comprises one or more of: an indication of at least one respective computing sub-task type the networked computer resource is configured to process, a respective maximum computing workload for the networked computer resource, and a respective current computing workload.

The method 600 may further comprise determining a computing task to be processed, at 604. In one example, computing tasks received from requesters (e.g., using computing task requester device 110) may be stored in a queue (e.g., computing task database 106, computing task database 218) and processed by a computer resource controller according to priority, time of receipt, or according to a schedule. In another example, computing tasks may be processed in a real-time allocation process as the computing tasks are received. According to some embodiments, as discussed in this disclosure, a given computing task may be associated with one or more computing sub-tasks.

The method 600 may further comprise determining, for each sub-task of the computing task, a respective sub-task type, at 606. In some embodiments, the method 600 may comprise identifying one or more sub-tasks associated with a computing task to be processed. In one embodiment, a requester (e.g., a user or other computing device requesting execution of the computing task) may identify one or more sub-tasks that make up the computing task. Indications of the related sub-tasks may be stored in a data storage device (e.g., for when the computing task is processed). For example, a computer resource controller may access a computing task database to determine what sub-tasks are associated with a computing task, and to determine respective sub-task types associated with each sub-task. In one embodiment, a request to process a computing task may not include an indication of any sub-tasks, and a computer resource controller may be configured with instructions (e.g., computing sub-task analysis instructions 542-2) to analyze received computing tasks and to parse the computing task into one or more sub-tasks. In this way, a computing task may be efficiently divided into computing sub-tasks, and each sub-task allocated efficiently to at least one computer resource for processing.

According to some embodiments, determining a sub-task type may comprise determining a task complexity for a sub-task based on, for example, stored task complexity assignment rules. In one or more embodiments, therefore, determining a sub-task type may comprise accessing stored task complexity assignment rules, determining a task complexity based on the rules and the sub-task, and selecting, from a plurality of potential computing sub-task types, a sub-task type based on the determined task complexity.

In some embodiments, determining a sub-task type may comprise receiving computing sub-task information associated with the sub-task, and selecting, from a plurality of potential computing sub-task types, a sub-task type based on the sub-task information. In one or more embodiments, determining the sub-task type may be based on both sub-task information and a task complexity associated with the sub-task.

In some embodiments, the method 600 may further comprise accessing stored computer resource rules, at 608, and determining, for each sub-task of the computing task, a respective computer resource score (e.g., based on the stored computer resource rules), at 610. In one embodiment, determining the computer resource score for a particular computing sub-task comprises making the determination based on the computer resource score rules and the sub-task type associated with the sub-task.

According to some embodiments, a computer resource allocation rule may comprise one or more of various types of formulas. In one example, a rule may comprise a formula that provides for comparing a computer resource score for one or more sub-tasks to a maximum computing workload for a networked computer resource. For instance, a computer resource score 307 in a computing task database 218 may be accessed and compared to the maximum computing workload 406 in computer resource profile database 214 for at least one computer resource.

In another example, a computer resource allocation rule may comprise a formula for calculating a total computer resource score for a plurality of sub-tasks. For example, a formula may provide for aggregating respective computer resource scores for three sub-tasks associated with a computing task to determine a total computer resource score for the sub-tasks. In order to determine whether a given computer resource can process all three sub-tasks, the aggregate computer resource score for the plurality of sub-tasks may then be compared, for example, to a maximum computing workload associated with the computer resource.

In another example, a computer resource allocation rule may comprise a formula for determining, based on a respective current computing workload for a networked computer resource, whether a respective maximum computing workload for that networked computer resource would be exceeded for an associated predetermined period of time if at least one of the first sub-task and the second sub-task were assigned to that networked computer resource. For instance, a rule may be processed by accessing the current computing workload and maximum computing workload for a given computer resource (e.g., current computing workload "4" and maximum computing workload "10" for computer resource "CR05" in example table 400 of FIG. 4), and determining, for one or more sub-tasks to be processed, the associated computer resource scores. Then, the rule may provide for adding one or more of the computer resource scores (or an aggregate computer resource score, as discussed above) to the current computing workload to determine if that total computing workload exceeds the maximum computing workload for the computer resource in the associated time period (e.g., whether it exceeds a daily maximum computing workload).

The method 600 may further comprise accessing stored computer resource allocation rules, at 612, and determining an assignment of each sub-task to at least one computer resource (e.g., based on the stored computer resource allocation rules), at 614. In one or more embodiments, determining assignments for multiple sub-tasks of a computing task may comprise determining the assignments based on the computer resource allocation rules, the sub-task type and/or computer resource score associated with a first sub-task, and the sub-task type and/or computer resource score associated with a second sub-task.

In some cases, for multiple sub-tasks, the assigned computer resource will be the same computer resource for both; in other cases, each sub-task may be assigned a different computer resource. In some embodiments, sub-tasks having substantially similar task complexities, respectively, may be assigned to the same computer resource (e.g., in accordance with a computer resource allocation rule). In one example, where two sub-tasks have the same complexity value (e.g., "Medium Complexity") or have complexity levels within a predetermined range of each other, they may be assigned to the same computer resource for processing. In some embodiments, multiple sub-tasks having similarly low complexities (relative to other sub-tasks or other potential complexity levels) may be assigned to the same computer resource in accordance with an allocation rule. This may allow for more efficient processing of the computing task as a whole, by sending multiple sub-tasks with relatively low complexities to the same computer resource for processing, rather than splitting up such sub-tasks unnecessarily.

In some embodiments, sub-tasks having substantially different respective task complexities may be assigned to different computer resources in accordance with an allocation rule. For example, this may allow for more efficient processing of the computing task as a whole, by sending a more complex sub-task to one computer resource, while one or more other relatively lower complexity sub-tasks are assigned to a different computer resource.

In some embodiments, a method for allocating computer resources to requested tasks and sub-tasks may comprise forwarding an indication of a sub-task (e.g., a sub-task ID) to the assigned computer resource to initiate processing of the sub-task.

According to some embodiments, a method for allocating computer resources may comprise updating a current computing workload for a computer resource, based on the computer resource score for an assigned sub-task. For example, once a sub-task is assigned to a particular computer resource, the method may further include adding the computer resource score for that sub-task (and the computer resource scores of any other newly-assigned sub-tasks) to the current computing workload for the assigned computer resource, to reflect the increased workload of the computer resource.

In one or more embodiments, a method for allocating computer resources may comprise initiating the processing of a computing sub-task by an assigned computer resource. For example, information about a sub-task may be forwarded to a queue of computing sub-tasks for the assigned computer resource and/or a signal may be forwarded to the assigned computer resource instructing the assigned computer resource to begin executing the computing sub-task. In one embodiment, any output from the computer resource based on the assigned sub-task may be received by a computer resource controller and/or received by an associated computing task requester device.

According to some embodiments, assigning a computer resource may be based on location. For example, a sub-task to be assigned may be associated with a particular location, and identifying a computer resource to assign to the sub-task may take that location information into account (e.g., by selecting a computer resource within the same location, or within a predetermined range of the location).

In some embodiments, a computing task may be associated with a plurality of sub-files. For example, if the computing task involves processing files (e.g., account files, video files, etc.), then each sub-task associated with the computing task may correspond to the processing of a respective sub-file.

As discussed in this disclosure, the present invention provides for systems, apparatus, methods, articles of manufacture, and/or computer-readable media to facilitate determining, for each sub-task of a requested computing task, a respective sub-task type; determining, for each sub-task of the computing task, a respective computer resource score; and determining an assignment of each sub-task to at least one computer resource. In some embodiments, enterprise resources may include various types of resources available in or to an enterprise, such as a business or organization. Enterprise resources may include various types of resources, such as computer resources or personnel resources (e.g., account managers, file handlers, computer processing specialists, etc.), suitable for processing and/or assisting with the processing of computing tasks. In one example, a request for processing of a computing task related to a financial or account file may be received by a computer resources controller device from a file handler (e.g., via the file handlers computer workstation), and the computing task may be assigned to one or more computer resources (e.g., a server configured to process certain sub-tasks) and/or personnel resources (e.g., a specialist experienced with analyzing certain types of files or sub-files).

Accordingly, embodiments described in this disclosure with respect to a plurality of computer resources may be modified, in accordance with other embodiments contemplated by this disclosure, to accommodate (in addition, or in the alternative) other types of enterprise resources, such as personnel resources. According to some embodiments, systems, apparatus, methods, articles of manufacture, and/or computer-readable media facilitate determining, for each sub-task of a requested computing task, a respective sub-task type; determining, for each sub-task of the computing task, a respective enterprise resource score; and determining an assignment of each sub-task to at least one enterprise resource (e.g., enterprise computer resource, enterprise personnel resource).

According to some embodiments, the computer resource controller 102 of FIG. 1 and/or the computing task manager system 201 may comprise a device (or system) owned and/or operated by or on behalf of or for the benefit of an insurance company. The insurance company may utilize customer information, claim information, computer resource information, and/or loss information (e.g., information about insured losses associated with a customer), in some embodiments, to manage the allocation of various types of computing tasks (e.g., computing tasks related to claims handling) for the insurance company.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The phrase "based on" does not mean "based only on", unless expressly specified otherwise. In other words, the phrase "based on" describes both "based only on" and "based at least on".

As used in this disclosure, a "user" may generally refer to any individual and/or entity that operates a user device.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather may include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., specially-configured and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated among a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system comprising:
   a plurality of networked computer resources configured for processing pending computing tasks;
   a computer controller device in communication with the plurality of networked computer resources, and executing a computing task manager application configured with computer-readable instructions for dynamically allocating computing tasks to the plurality of networked computer resources, wherein executing the computing task manager application performs a method comprising:
   receiving, by the computing task manager application, respective computer resource profile information for each of the plurality of networked computer resources configured for processing pending computing tasks,
      the computer resource profile information comprising:
         an indication of at least one respective computing sub-task type the networked computer resource is configured to process,
         a respective maximum computing workload for the networked computer resource, and
         a respective current computing workload;
   receiving, by the computing task manager application, a pending computing task to be processed,
      wherein the pending computing task is associated with:
         a first computing sub-task, and
         a second computing sub-task;
   determining a first computing sub-task type corresponding to the first computing sub-task;
   determining a second computing sub-task type corresponding to the second computing sub-task;
   accessing stored computer resource score rules;
   determining a computer resource score for the first computing sub-task, based on the computer resource score rules and the first computing sub-task type;
   determining a computer resource score for the second computing sub-task, based on the computer resource score rules and the second computing sub-task type;
   accessing stored computer resource allocation rules;
   determining, based on (i) the computer resource allocation rules, (ii) the first computing sub-task type, and (iii) the second computing sub-task type, an assignment of the first computing sub-task and the second computing sub-task to at least one computer resource.

2. The system of claim 1, wherein the determined at least one computer resource comprises one of:
   a same networked computer resource, or
   different networked computer resources.

3. The system of claim 2, wherein determining the assignment of the first computing sub-task and the second computing sub-task to the same networked computer resource comprises:
   selecting, from the plurality of networked computer resources, a single networked computer resource based on (i) the computer resource score for the first computing sub-task, (ii) the computer resource score for the second computing sub-task, (iii) the respective maximum computing workload for the single networked computer resource, and (iv) the respective current computing workload for the single networked computer resource; and assigning the first computing sub-task and the second computing sub-task to the single networked computer resource for processing.

4. The system of claim 2, wherein determining the assignment of the first computing sub-task and the second computing sub-task to different networked computer resources comprises:

selecting, from the plurality of networked computer resources, a first networked computer resource based on (i) the computer resource score for the first computing sub-task, (ii) the respective maximum computing workload for the first networked computer resource, and (iii) the respective current computing workload for the first networked computer resource;

assigning the first computing sub-task to the first networked computer resource for processing;

selecting, from the plurality of networked computer resources, a second networked computer resource based on (i) the computer resource score for the second computing sub-task, (ii) the respective maximum computing workload for the second networked computer resource, and (iii) the respective current computing workload for the second networked computer resource; and assigning the second computing sub-task to the second networked computer resource for processing.

5. The system of claim 2, wherein executing the computing task manager application further performs:

determining a task complexity for the first computing sub-task;

determining a task complexity for the second computing sub-task; and wherein determining the assignment of the first computing sub-task and the second computing sub-task to at least one computer resource comprises:

determining that the task complexity for the first computing sub-task is substantially the same as the task complexity for the second computing sub-task; and determining to assign the first computing sub-task and the second computing sub-task to the same networked computer resource based on the task complexity for the first computing sub-task being substantially the same as the task complexity for the second computing sub-task.

6. The system of claim 5, wherein the determined task complexity for the first computing sub-task indicates a low complexity.

7. The system of claim 2, wherein executing the computing task manager application further performs:

determining a task complexity for the first computing sub-task;

determining a task complexity for the second computing sub-task;

wherein determining the assignment of the first computing sub-task and the second computing sub-task to at least one computer resource comprises:

determining that the task complexity for the first computing sub-task is different from the task complexity for the second computing sub-task; and determining to assign the first computing sub-task and the second computing sub-task to different networked computer resources based on the task complexity for the first computing sub-task being different from the task complexity for the second computing sub-task.

8. The system of claim 1, wherein determining the first computing sub-task type corresponding to the first computing sub-task comprises:

accessing stored task complexity assignment rules;

determining a task complexity for the first computing sub-task based on the task complexity assignment rules and the first computing sub-task; and selecting, from a plurality of potential computing sub-task types, the first computing sub-task type based on the task complexity determined for the first computing sub-task.

9. The system of claim 1, wherein determining the first computing sub-task type corresponding to the first computing sub-task comprises:

receiving computing sub-task information associated with the first computing sub-task; and selecting, from a plurality of potential computing sub-task types, the first computing sub-task type based on the computing sub-task information associated with the first computing sub-task.

10. The system of claim 1, wherein determining the first computing sub-task type corresponding to the first computing sub-task comprises:

determining a task complexity for the first computing sub-task;

determining computing sub-task information associated with the first computing sub-task; and determining the first computing sub-task type based on the task complexity and the computing sub-task information.

11. The system of claim 1, wherein the pending computing task is further associated with a third computing sub-task.

12. The system of claim 11, wherein the determined at least one computer resource comprises the same networked computer resource; and wherein executing the computing task manager application further performs:

assigning the third computing sub-task to a different networked computer resource for processing.

13. The system of claim 11, wherein the determined at least one computer resource comprises the same networked computer resource; and wherein executing the computing task manager application further performs:

assigning the third computing sub-task to the same networked computer resource for processing.

14. The system of claim 1, wherein the respective maximum computing workload for each networked computer resource is associated with a predetermined period of time.

15. The system of claim 14, wherein the predetermined period of time comprises one of the following:

a minute,
an hour,
a day,
a week,
a month, or
a year.

16. The system of claim 14, wherein the respective current computing workload for each networked computer resource is associated with the predetermined period of time.

17. The system of claim 1, wherein accessing the stored computer resource score rules comprises:

accessing a database of computing sub-task types, each computing sub-task type being stored in association with a respective predetermined sub-task computer resource score.

18. The system of claim 1, wherein the stored computer resource allocation rules comprise at least one of:
   a formula for calculating a total computer resource score for a plurality of sub-tasks,
   a formula for comparing a computer resource score to a maximum computing workload for a networked computer resource, and
   a formula for determining, based on a respective current computing workload for a networked computer resource, whether a respective maximum computing workload for that networked computer resource would be exceeded for an associated predetermined period of time if at least one of the first sub-task and the second sub-task were assigned to that networked computer resource.

19. The system of claim 1, wherein executing the computing task manager application further performs:
   updating the respective current computing workload for the first networked computer resource based on the computer resource score for the first computing sub-task.

20. The system of claim 19, wherein updating the respective current computing workload for the first networked computer resource comprises:
   adding the computer resource score for the first computing sub-task to the respective current computing workload for the first networked computer resource.

21. The system of claim 20, wherein updating the respective current computing workload for the first networked computer resource further comprises:
   adding the computer resource score for the second computing sub-task to the respective current computing workload for the first networked computer resource.

22. The system of claim 1, wherein executing the computing task manager application further performs:
   initiating processing of the first computing sub-task by a single networked computer resource.

23. The system of claim 1, wherein executing the computing task manager application further performs:
   determining a location associated with the first computing sub-task; and
   wherein determining an assignment of the first computing sub-task and the second computing sub-task to at least one computer resource is further based on the location associated with the first computing sub-task.

24. The system of claim 1, wherein the pending computing task comprises automated processing of a plurality of sub-files, wherein the first computing sub-task comprises processing a first sub-file, and wherein the second computing sub-task comprises processing a second sub-file.

* * * * *